(12) United States Patent
Chung et al.

(10) Patent No.: US 11,753,601 B2
(45) Date of Patent: *Sep. 12, 2023

(54) ULTRA-LOW FRICTION MATERIALS FOR LUBRICATING SURFACES, DEVICES THEREWITH, AND METHODS OF MANUFACTURE AND USE THEREOF

(71) Applicants: Dura-Line LLC, Knoxville, TN (US); Jin Chung, Atlanta, GA (US)

(72) Inventors: H. Thomas Chung, Powell, TN (US); Fei Fan, Knoxville, TN (US); Sung Ki Cho, Knoxville, TN (US); Sam Lukubira, Knoxville, TN (US); Caleb Michael Spradling, Knoxville, TN (US); Arturo Valencia, Knoxville, TN (US)

(73) Assignee: Dura-Line LLC, Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/670,796

(22) Filed: Feb. 14, 2022

(65) Prior Publication Data
US 2022/0167757 A1 Jun. 2, 2022

Related U.S. Application Data

(62) Division of application No. 17/222,245, filed on Apr. 5, 2021.
(Continued)

(51) Int. Cl.
*C10M 169/04* (2006.01)
*C10M 103/02* (2006.01)
(Continued)

(52) U.S. Cl.
CPC ....... *C10M 169/041* (2013.01); *A47C 27/002* (2013.01); *A47C 31/001* (2013.01);
(Continued)

(58) Field of Classification Search
CPC .......... C10M 157/10; C10M 103/02; C10M 111/04; C10M 169/041; C10M 157/02;
(Continued)

(56) References Cited

U.S. PATENT DOCUMENTS 2,510,078 A 6/1950 Compton
2,510,112 A 6/1950 Holbrook
(Continued)

FOREIGN PATENT DOCUMENTS

CA 2817162 5/2012
GB 832163 4/1960
(Continued)

OTHER PUBLICATIONS

Bell, The effect of PTFE thickener particle characteristics on grease formulation and performance, Material Science, NLGI Spokesman, 1996, vol. 60, pp. 12-15.
(Continued)

*Primary Examiner* — Vishal V Vasisth
(74) *Attorney, Agent, or Firm* — Joseph T. Leone; DeWitt LLP (57) ABSTRACT

A polymeric material mixture comprising a fluorine-containing polymer, a siloxane polymer, and at least two polymer processing additives (PPA), wherein the at least two polymer processing additives have different chemistries. For example, there can be a flexible coextruded pipe for providing a protective housing for cables, fluids, sludge or solids, the pipe comprising a pair of telescopically related inner and outer layers, where said inner layer is lubricated with the polymeric material mixture.

18 Claims, 2 Drawing Sheets

Related U.S. Application Data (60) Provisional application No. 63/005,948, filed on Apr. 6, 2020.

(51) Int. Cl.
| | | |
|---|---|---|
| *C10M 107/38* | (2006.01) | |
| *C10M 107/50* | (2006.01) | |
| *C10M 111/04* | (2006.01) | |
| *C10M 143/02* | (2006.01) | |
| *C10M 147/02* | (2006.01) | |
| *C10M 157/02* | (2006.01) | |
| *A47C 27/00* | (2006.01) | |
| *A47C 31/00* | (2006.01) | |
| *C10N 40/32* | (2006.01) | |
| *C10N 50/08* | (2006.01) | |
| *A47C 27/04* | (2006.01) | |
| *A47C 27/20* | (2006.01) | |

(52) U.S. Cl.
CPC ........ *C10M 103/02* (2013.01); *C10M 107/38* (2013.01); *C10M 107/50* (2013.01); *C10M 111/04* (2013.01); *C10M 143/02* (2013.01); *C10M 147/02* (2013.01); *C10M 157/02* (2013.01); *A47C 27/001* (2013.01); *A47C 27/04* (2013.01); *A47C 27/20* (2013.01); *C10M 2201/0413* (2013.01); *C10M 2205/022* (2013.01); *C10M 2213/02* (2013.01); *C10M 2213/0623* (2013.01); *C10M 2229/025* (2013.01); *C10N 2040/32* (2013.01); *C10N 2050/08* (2013.01)

(58) Field of Classification Search
CPC .......... C10M 143/02; C10M 107/38; C10M 107/50; C10M 147/02; C10M 2201/0413; C10M 2205/022; C10M 2213/0623; C10M 2229/025; C10M 2213/02; C08K 3/042; C09D 183/04; C08L 27/18; C08L 27/12; C08L 23/06; C08L 83/04; C10N 2030/06; C10N 2040/32; C10N 2020/06; C10N 2050/08; C10N 2020/04
See application file for complete search history.

(56) References Cited

U.S. PATENT DOCUMENTS

| | | |
|---|---|---|
| 3,159,577 A | 12/1964 | Ambrose |
| 3,247,116 A | 4/1966 | Reiling |
| 3,432,511 A | 3/1969 | Reiling |
| 3,493,513 A | 2/1970 | Petriello |
| 3,998,770 A | 12/1976 | Malhotra |
| 4,284,518 A | 8/1981 | Reick |
| 4,349,444 A | 9/1982 | Reick |
| 4,615,817 A | 10/1986 | McCoy |
| 4,834,894 A | 5/1989 | Scheid |
| 4,888,122 A | 12/1989 | McCready |
| 4,892,442 A | 1/1990 | Shoffner |
| 5,160,646 A | 11/1992 | Scheid |
| 5,565,417 A | 10/1996 | Salvia |
| 5,783,308 A | 7/1998 | Leendersen |
| 5,846,447 A | 12/1998 | Beatty |
| 2004/0019143 A1* | 1/2004 | Koloski ............... C09D 5/1612 |
| | | 524/434 |
| 2011/0170810 A1 | 7/2011 | Oki et al. |
| 2015/0175787 A1 | 6/2015 | Zia et al. |
| 2017/0058098 A1* | 3/2017 | Thomas ................... C08K 3/22 |
| 2018/0258241 A1 | 9/2018 | Zia et al. |

FOREIGN PATENT DOCUMENTS

| | | |
|---|---|---|
| GB | 2308598 | 7/1997 |
| WO | WO1993/14546 | 7/1993 |

OTHER PUBLICATIONS

Canada Office Action dated Jan. 7, 2022 in related Application 3113778 filed Jan. 7, 2014 (4 pages).
Ebnesajjad et al., Fluoropolymer Additives, Chapter 6, Application of Fluorinated Additives for Lubricants, 2012, pp. 69-106.
International Search Report and Written Opinion dated Jul. 7, 2021 for Application PCT/US21/25737 filed Apr. 5, 2021 (16 pages).
Kamel et al., Tribological Properties of Graphene Nanosheets as an Additive in Calcium Grease, Journal of Dispersion Science and Technology, 2017, vol. 38, No. 10, pp. 1495-1500.

* cited by examiner

ULTRA-LOW FRICTION MATERIALS FOR LUBRICATING SURFACES, DEVICES THEREWITH, AND METHODS OF MANUFACTURE AND USE THEREOF

CROSS-REFERENCE TO RELATED PATENT APPLICATIONS

This patent application is a Divisional of U.S. patent application Ser. No. 17/222,245 filed 5 Apr. 2021; which claims a benefit of priority to U.S. Patent Application 63/005,948 filed 6 Apr. 2020; each of which is incorporated by reference herein in its entirety for all purposes.

TECHNICAL FIELD

This disclosure enables various ultra-low friction materials for lubrication of surfaces, devices therewith, and methods of manufacture and use thereof. Some examples of such surfaces include multi-layered pipes, ducts, tubes, channels, or conduits for housing of or conveyance for fiber optic cables, electrical cables, fluids, or others, whether used in telecommunications, electrical, medical, vehicular transportation, consumer products, construction, projectile barrels, missiles, rockets, trains, or fluid transportation industries.

BACKGROUND

Pipes of various materials, including plastic pipes, are used for a variety of applications, including in telecommunications, electricity, oil and gas, and water transportation industries. Such pipes are usually manufactured using high density polyethylene (HDPE) and usually have a tensile strength to sustain various pulling loads during installation as well as provide some friction resistance for various objects transported therethrough (e.g., cables).

Figure 1A:
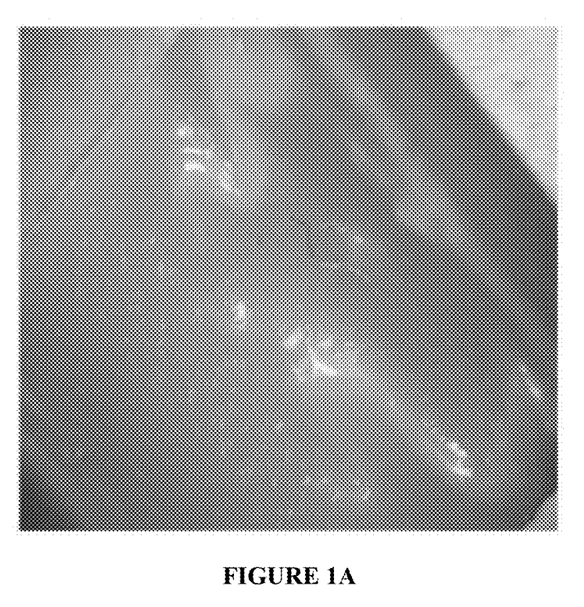
FIG. 1A is an illustration of a photograph of material segregation caused by melt fracture.
Figure 1B:
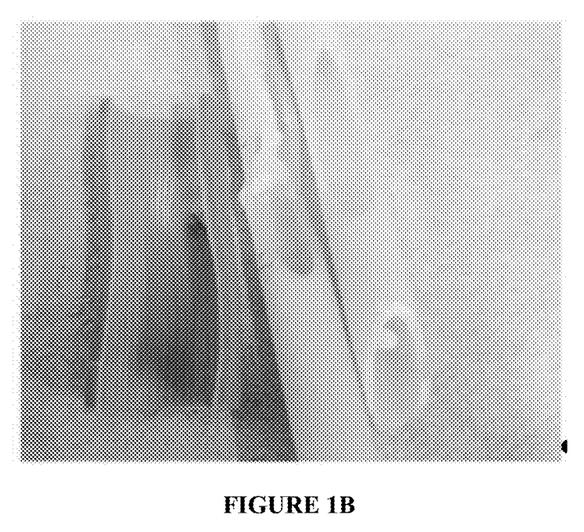
FIG. 1B is an illustration of a photograph of typical defects in standard HDPE pipes.

U.S. Pat. No. 4,892,442 describes some usage of a silicone oil (e.g., low molecular weight siloxane having a viscosity of 10,000 $mm^2$/s to 100,000 $mm^2$/s)-based slip aid to create a pre-lubricated inner layer for a HDPE pipe. However, due to some immiscibility of some components of the pre-lubricated inner layer and HDPE, there are various technological difficulties associated with manufacture a pipe having a diameter of less than 10 mm. For example, some of such technological difficulties include formation of a non-uniform inner layer during a co-extrusion process. Additionally, although such silicone oils may be used to improve flow of thermoplastics, such use can be limited due to a lack of a good incorporation technique of a liquid into a thermoplastic melt. For example, some of these silicone oils tend to migrate to surface when the thermoplastic is in the molten phase, later remaining in discrete domains in the solidified thermoplastic. In addition, for low molecular weight (MW) siloxanes (e.g., silicone oils), there may be an intense shear present during extrusion, which can trigger polymer de-polymerization and crosslinking despite the low MW siloxanes having better thermal resistance than hydrocarbon oils. Consequently, gel formation can cause blockage in the pipes during manufacturing. For example, FIGS. 1A and 1B are photographs showing some material segregation caused by a melt fracture (FIG. 1A) and some defects in some finished goods (FIG. 1B).

SUMMARY

Broadly, this disclosure enables various ultra-low friction materials that can be used for lubricating of surfaces, whether those surface are inner surfaces or outer surfaces. For example, some of such ultra-low friction materials can be used for construction, manufacture, or use of objects, pipes, ducts, tubes, channels, or conduits, each having a pre-lubricated inner or outer layer or surface, which can also address some drawbacks associated with known lubrication materials. Note that details of other embodiments of this disclosure are included in a following detailed description and various accompanying drawings. Likewise, note that certain features of these embodiments are, for clarity, described in context of separate embodiments, but can also be provided in combination as a single embodiment.

An embodiment can include a device comprising: a surface coated with a polymeric material mixture including a fluorine-containing polymer, a siloxane polymer, and a plurality of polymer processing additives, wherein the polymer processing additives have different chemistries.

An embodiment can include a flexible coextruded pipe for providing a protective housing for a cable, a fluid, a sludge, or a solid, wherein the flexible coextruded pipe includes a pair of telescopically related inner and outer layers, wherein the inner layer is lubricated with a polymeric material mixture, and wherein the outer layer comprises a polymeric material, metal, ceramic, rubber, or composite. For example, there can be a tensile strength of such materials that is preferably 20 MPa or more, such as a commercial pipe grade HDPE resin used for commercial pipes.

In another embodiment, the inner layer can have has a coefficient of friction from about 0.04 to about 0.10.

In another embodiment, the outer layer can comprise a high molecular weight, a high density polyethylene (HDPE) and a color concentrate. There can be an amount of color concentrate from about 1.0% w/w to about 2.0% w/w based on a total weight of a material of the outer layer.

In another embodiment, there can be an amount of HDPE present in the outer layer that is at least about 97%, and preferably about 97% to about 100%, about 97% to about 99.5%, about 97% to about 99%, about 97.5 to about 99%, about 98% to about 99%, and various intermediary values.

In another embodiment, some ultraviolet agents may be optionally added to the polymeric material mixture.

An embodiment can include a polymeric material mixture comprising polytetrafluoroethylene (PTFE), ultra-high molecular weight (UHMW) siloxane polymer, and at least two polymer processing additives (PPA), wherein the at least two PPAs have different chemistries.

In another embodiment, the at least two PPAs can comprise at least one PPA, which is a fluoropolymer-based material, and at least one PPA, which is a hydrocarbon-based material.

In another embodiment, the polymeric mixture can comprise: the PTFE in an amount of about 10.0% to about 20.0%; the UHMW siloxane in an amount from about 20.0% to about 40.0%; the fluoropolymer-based PPA in an amount from about 10.0% to about 15.0%; and the hydrocarbon-based PPA in an amount from about 10.0% to about 25.0%, based on the total weight of the polymeric mixture.

An embodiment can include a polymeric material mixture comprising graphene, a ultra-high molecular weight (UHMW) siloxane polymer, and at least two polymer processing additives (PPA), wherein the at least two PPAs have different chemistries.

In another embodiment, the polymeric mixture can comprise: the graphene in an amount of about 10.0% to about 40.0%; the UHMW siloxane in an amount of about 20.0% to about 60.0%; the fluoropolymer-based PPA in an amount of about 10.0% to about 15.0%; and the hydrocarbon-based PPA in an amount of about 10.0% to about 25.0% based on the total amount of the polymeric mixture.

In another embodiment, the particle size distribution of PTFE can have a $D_{50}$ of about 40 μm to about 50 μm and a $D_{90}$ of about 150 μm to about 200 μm, wherein $D_{50}$ can be a median value of particle size diameters in the particle size distribution and $D_{90}$ can be a particle size value at which 90% of the particle size distribution has a smaller size particle diameter.

In another embodiment, the $D_{50}$ can be about 46 μm and $D_{90}$ is about 166 μm.

In another embodiment, the material of the pipe can be selected from plastic, metal, ceramic, rubber, shape memory material, wood, and composite material.

Another embodiment can include a method for transporting a material through a pipe, the method comprising passing a solid, a sludge, or a fluid through the pipe.

Another embodiment can include a method of manufacturing a pipe for providing a protective housing for or conveyance of cables, fluids, sludge, or solids, the method comprising: coating an inner or outer layer or surface of a pipe comprising a pair of telescopically related inner and outer cylindrical or non-cylindrical layers with the polymeric material mixture. The pipe can be flexible or coextruded.

DESCRIPTION OF DRAWINGS

Embodiments are now further described with reference to the accompanying drawings, in which.

DETAILED DESCRIPTION

Various advantages and features of this disclosure, and methods for accomplishing the same are more clearly understood from various embodiments described below with reference to any accompanying drawings. However, this disclosure is not limited to the following embodiments and can be implemented in various different forms.

This disclosure enables various ultra-low friction materials for lubrication of surfaces. For example, some of such surfaces can be inner, outer, intermediate, or others. These surfaces can be included in single or multi-layered pipes, ducts, tubes, channels, or conduits for housing, routing, transportation, or conveyance of fiber optic cables, electrical cables (or wires, ropes, chains, lines, or other elongated items), data cables (or wires, ropes, chains, lines, or other elongated items), fluids (e.g., liquids, gases), or other objects, whether used in telecommunications, electrical, medical, vehicular transportation, consumer products, construction, projectile barrels, missiles, rockets, trains, or fluid transportation industries. For example, some of such surfaces can be included in aerostructures, wings, tails, ailerons, winglets, boats, submarines, ships, missiles, automotive frontal grills, car panels, windshields, wheels, tires, rollers, medical tubing, swallowable medical devices, implantable medical devices, rain-resistant or rain-proof clothing or shoes, snow-blower augers, cutting blades, door or cabinet hinges, pads, gauze, fabrics, or other objects. For example, some of these low-friction materials can be used in permanently or non-permanently lubricated inner or outer layers or surfaces of pipes, ducts, tubes, channels, conduits, or other objects and particularly HDPE pipes, ducts, tubes, channels, conduits, or other objects that can provide superior or improved tribological properties and an environment for an installation, placement, housing, routing, transportation, or conveyance of cables (or wires, ropes, chains, lines, or other elongated items), water (or other fluids or liquids or gases), or other objects, whether natural or artificial. Also, this disclosure seeks to improve some availability of some critical raw materials, some processing and mechanical properties to achieve superior or improved performance properties in some finished goods or objects.

Note that various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

As used herein, like reference numerals can generally denote like elements throughout this disclosure. As used herein, terms such as "including" and "having" are generally intended to allow other components to be included unless these terms are used in conjunction with the term "only."

Whenever a numerical range is indicated herewith, the numerical range is meant to include any cited numeral (fractional or integral) within the indicated range. The phrases "ranging/ranges between" a first indicated number and a second indicated number and "ranging/ranges from" a first indicated number "to" a second indicated number are used herein interchangeable and are meant to include the first and second indicated numbers and all fractional and integral numerals therebetween.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "10 μm" is intended to mean "about 10 μm."

As used herein, numbers and/or numerical ranges preceded by the term "about" should not be considered to be limited to the recited range. Rather, numbers and/or numerical ranges preceded by the term "about" should be understood to include a range accepted by those skilled in the art for any given element in formations according to the subject invention.

As used herein, when a numerical value is preceded by the term "about," the term "about" is intended to indicate +/−20%.

As used herein, the singular form "a," "an" and "the" include plural references unless the context clearly dictates otherwise. For example, the term "a compound" or "at least one compound" can include a plurality of compounds, including combinations and/or mixtures thereof.

As used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Additionally, although terms first, second, and others can be used herein to describe various elements, components, regions, layers, or sections, these elements, components, regions, layers, or sections should not necessarily be limited by such terms. Rather, these terms are used to distinguish one element, component, region, layer, or section from another element, component, region, layer, or section. As such, a first element, component, region, layer, or section discussed below could be termed a second element, component, region, layer, or section without departing from this disclosure.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

It is appreciated that certain features of the exemplary embodiments described herein, which are, for clarity, described in the context of separate embodiments, can also be provided in combination in a single embodiment. Conversely, various features of the exemplary embodiments, which are, for brevity, described in the context of a single embodiment, can also be provided separately or in any suitable sub-combination or as suitable in any other described embodiment. Certain features described in the context of various embodiments are not to be considered essential features of those embodiments, unless the embodiment is inoperative without those elements.

Hereby, all issued patents, published patent applications, and non-patent publications that are mentioned or referred to in this disclosure are herein incorporated by reference in their entirety for all purposes, to a same extent as if each individual issued patent, published patent application, or non-patent publication were specifically and individually indicated to be incorporated by reference. To be even more clear, all incorporations by reference specifically include those incorporated publications as if those specific publications are copied and pasted herein, as if originally included in this disclosure for all purposes of this disclosure. Therefore, any reference to something being disclosed herein includes all subject matter incorporated by reference, as explained above. However, if any disclosures are incorporated herein by reference and such disclosures conflict in part or in whole with this disclosure, then to an extent of the conflict or broader disclosure or broader definition of terms, this disclosure controls. If such disclosures conflict in part or in whole with one another, then to an extent of conflict, the later-dated disclosure controls.

In an embodiment, an ultra-low friction material can comprise a combination of polytetrafluoroethylene (PTFE), a ultra-high molecular weight (UHMW) siloxane polymer, and two different polymer processing additives (PPAs) that have different chemistries.

In another embodiment, the UHMW siloxane polymer can be designed to be applied as an additive in resin (or non-resin) compatible (or non-compatible) systems to improve surface properties. The UHMW siloxane polymer can have several advantages over typical silicone oils that may be used in plastic industry as mold releasing agents. As described above, some use of silicone oils can be limited due to lack of a good incorporation technique of some liquid silicone oils into some thermoplastic melts. Also, silicone oils can tend to migrate to surface when the thermoplastic is in the molten phase, later remaining in discrete domains in solidified thermoplastic. Unlike some low molecular weight silicone oils having viscosities of about 1000 $mm^2/s$ to about 100000 $mm^2/s$ that can migrate, the UHMW siloxanes with viscosities of at least 10 million $mm^2/s$ provide some thermal stability during manufacturing as well as an improved abrasion resistance, lower wear rates, and reduced coefficient of friction of surface (e.g., pipe inner layer).

Synergistic effects of mixed materials for enhanced performance, such as extreme pressure performance and lower viscosity lubricants, have also been studied. Applications of PTFE using a mixture of PTFE with other materials, such as polychlorotrifluoroethylene, silica, graphite, or polyethylene for potential as a lubricant or a fortifier of other thickeners, may have been somewhat described in some earlier patents, for example, in U.S. Pat. Nos. 2,510,078, 2,510,112, 3,247,116, 3,432,511, and Fluoropolymer Additives, Chapter 6. Application of Fluorinated Additives for Lubricants, pp. 69-106 (2012), all of which are incorporated by reference as if copied and pasted herein for all purposes, including the applications of PTFE using the mixture of PTFE with other materials. While these applications shed some light on combining PTFE with optional additives, a combination of PTFE with UHMW siloxane and polymer processing additives to improve various tribological properties, as described herein, have not been specifically described before.

Fluorocarbon solids are generally stable because of a strength of a carbon-fluorine bond, and strength and stability of such materials increases when multiple carbon-fluorine bonds are present in a material. Any fluorocarbon solid having a low coefficient of friction (COF) can be suitable for use, as described herein. For example, some fluorocarbon solids having a COF of about 0.01 to about 0.15, about 0.02 to about 0.14, about 0.03 to about 0.13, about 0.04 to about 0.12, about 0.05 to about 0.11, and about 0.05 to about 0.10. PTFE, an example fluorocarbon solid, has a COF of about 0.05 to about 0.10, which can be some of a lowest coefficient of friction (COF) of any solid. When used as a solid lubricant, PTFE can reduce friction, wear, and energy consumption of machinery in a wide range of use temperatures. In some situations, the PTFE can be nonreactive, and highly resistant against corrosive chemicals. Some effects of physical properties of the PTFE, including type, particle size, and molecular weight (MW) have been previously studied for low friction and ball bearing uses, as described in GB Patent 832163, U.S. Pat. Nos. 3,159,577, 3,493,513, 4,615,817, 4,888,122, and G. A. Bell (The effect of PTFE thickener particle characteristics on grease formulation and performance, ELGI Annual General Meeting, May 9, 1995) all of which are incorporated by reference as if copied and pasted herein for all purposes, including the effects of physical properties of the PTFE.

Lubricants that contain small PTFE particles, for example, in the 1 μm to 20 μm range, or PTFE in the low molecular weight range from about 10,000 to about 500,000, can result in smoother surfaces, indicating that optimization of particle sizes can be an important factor for successful application of PTFE for some enhanced tribological properties. Some properties of PTFE have been described previously in U.S. Pat. Nos. 3,247,116, 4,284,518, 4,834,894, 5,160,646, and 5,846,447, all of which are incorporated by reference as if copied and pasted herein for all purposes, including the properties of PTFE.

PTFE in the ULF MB can be replaced by other solid lubricants with a lamellar structure, such as graphite, molybdenum disulfide and boron nitride. Other solid lubricants that can be used include sulfides, selenides, and tellurides of molybdenum, tungsten, niobium, tantalum, titanium, chlorides of cadmium, cobalt, lead, cerium, zirconium and some borates like sodium tetraborate and sulfates like silver sulfate.

Nonetheless, it may not be feasible to apply these materials for developing a surface (e.g., inner layer of a pipe) with low friction because of financial cost and environmental safety. In comparison, any lamellar structure, such as graphene, boron nitride, molybdenum disulfide, and the like, can be suitable material for use as a solid lubricant. Some properties of PTFE materials in combination with such materials have been previously described in U.S. Pat. Nos. 4,349,444, 5,565,417, 5,783,308, and Andrew et al. (Tribological Properties of Graphene Nanosheets as an Additive in Calcium Grease, Journal of Dispersion Science and Technology, 38(10):1495-1500 (2016)), all of which are incorporated by reference as if copied and pasted herein for all purposes, including the properties of PTFE materials in combination with such materials.

PPAs can be made of a fluoropolymer dispersed in a polyolefin base resin. Fluoropolymers known in the art can be used as a suitable PPA. Because fluoropolymers can be immiscible with polyolefin base resins, under high shear conditions, some dispersed droplets of the fluoropolymer migrate out of a bulk melt to form a coating on the extruder and die wall surface. Besides addressing issues of processing, including die build-up and melt fracture, PPAs can be widely applied for optimizing polymer processing conditions, increasing production rate, and enhancing physical properties of some finished products. The fluoropolymer layer effectively eliminates some instabilities of flow at the die/polyethylene interface and effectively minimizes some formation of melt fracture, which can be a source of rough surface formation and promotes a higher throughput. During extrusion, this effect can be translated into a reduction of a gate pressure and to a smooth surface of the extrudate. Compared with common fluoropolymer-based PPAs, a hydrocarbon-based PPA can have some unique features including some improvement of low temperature impact and flexibility.

Similar to fluoropolymer PPAs, hydrocarbon PPAs are commercially available. As such, in some situations, a combined package of PPAs and low friction components can result in a superior performance of a surface (e.g., inner layer of pipe). In the case of hydrocarbon PPAs, they can provide for better low temperature impact and flexibility to the formulation.

For example, there can be a flexible (or non-flexible) coextruded (or non-coextruded) pipe for providing a protective housing for a cable, a fluid, a sludge, or a solid. The pipe can comprise a pair of telescopically related inner and outer cylindrical layers, where the inner layer is lubricated with a polymeric material mixture, and where the outer layer comprises a polymeric material, metal, or composite. Preferably, the tensile strength is at least 20 MPa. Note that this disclosure is not limited to pipes and other mechanical forms can have surfaces that are coated, as described herein.

In another embodiment, the UHMW siloxane can ha a viscosity from about 1 million $mm^2/s$ to about 100 million $mm^2/s$, about 2 million $mm^2/s$ to about 90 million $mm^2/s$, about 3 million $mm^2/s$ to about 80 million $mm^2/s$, about 4 million $mm^2/s$ to about 70 million $mm^2/s$, about 5 million $mm^2/s$ to about 68 million $mm^2/s$, about 6 million $mm^2/s$ to about 66 million $mm^2/s$, about 7 million $mm^2/s$ to about 64 million $mm^2/s$, about 8 million $mm^2/s$ to about 62 million $mm^2/s$, about 9 million $mm^2/s$ to about 60 million $mm^2/s$, and about 10 million $mm^2/s$ to about 60 million $mm^2/s$.

In another embodiment, the inner layer can have a coefficient of friction from about 0.04 to about 1.0, and preferably from about 0.04 to about 0.9, from about 0.04 to about 0.8, from about 0.04 to about 0.7, from about 0.04 to about 0.6, from about 0.04 to about 0.5, from about 0.04 to about 0.4, from about 0.04 to about 0.3, and from about 0.04 to about 0.2.

In another embodiment, the outer layer can comprise a high molecular weight, high density polyethylene (HDPE) and a color concentrate.

The amount of color concentrate can be about 1.0% w/w to about 10.0% w/w, about 1.0% w/w to about 9.0% w/w, about 1.0% w/w to about 8.0% w/w, about 1.0% w/w to about 7.0% w/w, about 1.0% w/w to about 6.0% w/w, about 1.0% w/w to about 5.0% w/w, about 1.0% w/w to about 4.0% w/w, about 1.0% w/w to about 3.0% w/w, and about 1.0% w/w to about 2.0% w/w based on the total weight of a material of the outer layer.

In another embodiment, the HDPE can be present in a surface (e.g., outer or inner layer) in an amount of at least about 90%, about 91% to about 99.5%, about 92% to about 99%, about 93% to about 99%, about 94% to about 99%, about 95% to about 99%, about 96% to about 99%, and about 97% to about 99%, based on a total weight of the outer layer composition.

Another embodiment can include a polymeric material mixture comprising polytetrafluoroethylene (PTFE), a ultra-high molecular weight (UHMW) siloxane polymer, and at least two PPAs, wherein the at least two PPAs have different chemistries.

In another embodiment, the at least two PPAs can comprise at least one PPA that is a fluoropolymer-based material and at least one PPA that is a hydrocarbon-based material.

In another embodiment, the polymeric mixture can comprise: the PTFE in an amount of about 5.0% to about 50.0%, about 5.0% to about 40.0%, about 5.0% to about 30.0%, about 10.0% to about 30.0%, and about 10.0% to about 20.0%; UHMW Siloxane in an amount of about 5.0% to about 50.0%, about 5.0% to about 40.0%, about 10.0% to about 40.0%, and 20.0% to about 40.0%; the fluoropolymer-based PPA in an amount of about 5.0% to about 30.0%, about 10.0% to about 20.0%, and about 10.0% to about 15.0%; and the hydrocarbon-based PPA in an amount of about 5.0% to about 50%, about 5.0% to about 40%, about 5.0% to about 35.0%, about 10.0% to about 30.0%, and about 10.0% to about 25.0%, based on the total weight of the polymeric mixture.

In another embodiment, the hydrocarbon-based PPA may be any suitable hydrocarbon-based polymer, including a polyethylene-based polymer. The hydrocarbon-based PPA may be commercially manufactured and/or commercially available. The hydrocarbon-based PPA may have a molecular weight of about 1,000,000 to about 5,000,000, about 1,000,000 to about 4,000,000, about 1,500,000 to about 3,500,000, and about 2,000,000 to about 3,000,000. The hydrocarbon-based PPA may have a glass transition temperature (Tg) of –100° C. to about 0° C., about –98° C. to about –10° C., about –96° C. to about –20° C., about –94° C. to about –30° C., about –92° C. to about –40° C., about –90° C. to about –50° C., about –88° C. to about –40° C., about –86° C. to about –60° C., about –84° C. to about –70° C., and about –80° C.

In another embodiment, the fluoropolymer-based PPA may be any suitable fluoropolymer-based polymer. The fluoropolymer-based PPA may have a molecular weight of about 1,000,000 to about 5,000,000, about 1,000,000 to about 4,000,000, about 1,500,000 to about 3,500,000, and about 2,000,000 to about 3,000,000. The fluoropolymer-based PPA may have a glass transition temperature (Tg) of −100° C. to about 0° C., about −98° C. to about −10° C., about −96° C. to about −20° C., about −94° C. to about −30° C., about −92° C. to about −40° C., about −90° C. to about −50° C., about −88° C. to about −40° C., about −86° C. to about −60° C., about −84° C. to about −70° C., and about −80° C.

Another embodiment can include a polymeric material mixture comprises graphene, ultra-high molecular weight (UHMW) siloxane polymer, and at least two polymer processing additives (PPA), where the at least two PPAs have different chemistries.

In another embodiment, the polymeric mixture can comprise: the graphene in an amount of about 5.0% to about 50.0%, about 5.0% to about 40.0%, about 5.0% to about 30.0%, about 10.0% to about 30.0%, and about 10.0% to about 20.0%; the UHMW Siloxane in an amount of about 5.0% to about 50.0%, about 5.0% to about 40.0%, about 10.0% to about 40.0%, and 20.0% to about 40.0%; the fluoropolymer-based PPA in an amount of about 5.0% to about 30.0%, about 10.0% to about 20.0%, and about 10.0% to about 15.0%; and the hydrocarbon-based PPA in an amount of about 5.0% to about 50%, about 5.0% to about 40%, about 5.0% to about 35.0%, about 10.0% to about 30.0%, and about 10.0% to about 25.0%, based on the total amount of the polymeric mixture.

In another embodiment, the particle size distribution of PTFE has a $D_{50}$ of about 10 μm to about 100 μm, about 15 μm to about 90 μm, about 20 μm to about 80 μm, about 30 μm to about 70 μm, about 40 μm to about 60 μm, and about 40 μm to about 50 μm, and a $D_{90}$ of about 100 μm to about 300 μm, about 110 μm to about 280 μm, about 120 μm to about 260 μm, about 130 μm to about 240 μm, about 140 μm to about 220 μm, and about 150 μm to about 200 μm, wherein $D_{50}$ is a median value of particle size diameters in the particle size distribution and $D_{90}$ is a particle size value at which 90% of the particle size distribution has a smaller size particle diameter.

In another embodiment, the $D_{50}$ is about 46 μm and $D_{90}$ can be about 166 μm.

In another exemplary embodiment, a material having the polymeric material mixture coated thereon, as described herein, is not limited, and can include any suitable material, such as natural and non-natural rubber, metals, alloys, shape memory materials, wood, silicon, ceramics, and polymers including plastics, polyethylene, polypropylene, polybutylene, polyvinylchloride, polyamides, or others.

In another embodiment, a material may have an innermost, outmost or intermediate surfaces thereof coated with the polymer material mixture described herein, and the material may be formed in various shapes, including but not limited to tubes, ducts, pipes, channels, sheaths, cables, wires, ropes, chains, casings, cylinders, packaging, lumens, wings, winglets, missiles, bullets, projectile barrels, railcars, locomotives, marine, aerial, or vehicle panels, ship or boat hulls, aerostructures, cutting blades, augers, snow blower augers, medical stents, medical implantables, medical swallables, catheters, cannulas, wheels, rollers, tires, fan blades, turbine blades, helicopter blades, windshields, automotive frontal grills, or others.

In another embodiment, a coated material may have any suitable shape and size, and may be straight or include bends, elbows, and turns, and the like.

Another embodiment is a method for transporting, routing, or conveying a material through a pipe, the method comprising: passing a solid (e.g., objects, cables, chains, ropes, beads, particulates, powders, boxes), a sludge, or a fluid (e.g., liquid, gas, steam, water, alcohol, edible, non-edible, gasoline, oil) including electronic and telecommunication wires and fiber optics, singly or in plural, and which may be sheathed or unsheathed; water; aqueous and non-aqueous solvents and solutions; alcohol; alcohol-based solvents and solutions; inert and non-inert gases; or others. This passing may be through or along a surface (e.g., inner, outer) that is coated, structured, or configured, as disclosed herein.

Coated and uncoated materials described herein may be used in a variety of applications, including but implantable or non-implantable medical devices and parts; vehicular applications, including parts of cars, boats, airplanes, or others; and such materials may be used below ground or above ground, in water, in air or others, without limitation.

Materials

The ultra-low friction material can include a mixture of polytetrafluoroethylene (PTFE), ultra-high molecular-weight siloxanes, and PPAs. PTFE can be a white solid (about 1 μm to about 12 μm in diameter) with a melting temperature of about 327° C. PTFE can offer self-lubrication at a wide range of temperatures, including temperatures as low as about −268° C. In various experiments described herein, siloxanes having a viscosity of about 50 million $mm^2/s$ viscosity are used. Such UHMW siloxanes can be compatible with high-density polyethylene (HDPE), the base resin of a surface (e.g., pipe). PPAs can give dynamic coating on the metal or non-metal surface of the extrusion die. Its dispersed droplets can migrate to the outside of the melt flow to form a coating on the metal (or non-metal) die wall, minimizing die build-up or drool.

Compounding

The material mixture for the low friction layer can be pre-compounded as a master batch (MB) using Leistritz ZSE18 twin-screw extruder (although another extruder can be used as well). The resulting MB was further diluted with HDPE during the extrusion process. A range of MB formulations are shown in Table 1:

TABLE 1

| Components | Amount (% w/w) |
| --- | --- |
| PTFE MB | 10.0 to 20.0 |
| UHMW Siloxane MB | 20.0 to 40.0 |
| Fluoropolymer-based PPA MB | 10.0 to 15.0 |
| Hydrocarbon-based PPA MB | 10.0 to 25.0 |

Table 2 below lists the various components, and respective amounts, of a composition in which the letdown ratio (LDR—the level at which the master batch is incorporated into the base HDPE polymer) was controlled using gravimetric feeders at about 10% of ULF MB ("ULF-10"):

TABLE 2

| Components | Amount (% w/w) |
| --- | --- |
| PTFE MB | 2.0 |
| UHMW Siloxane MB | 4.0 |
| Fluoropolymer-based PPA MB | 1.5 |
| Hydrocarbon-based PPA MB | 2.5 |

Extrusion

A ribbed-in pipe was coextruded by using Maillefer MXC60 and MXC45 device with the ribbed-in pipe having following dimensions:

Outer dimension (OD)/Inner dimension (ID): about 16 mm/13 mm
Total thickness: about 1.5 mm
Outer layer thickness: about 1.32 mm
Inner layer thickness: about 0.18 mm
Pipe Sample Preparations To see the effect of various ULF MB loadings on a "jetting performance" described below, the inner layer was prepared with four (4) different LDRs as shown in Table 3. The LDRs were controlled using gravimetric feeders at about 5%, about 10%, about 20%, and about 30% of ULF MB, and the corresponding pipes were designated as "ULF-5", "ULF-10", "ULF-20", and "ULF-30," respectively. For comparison, a pipe without ULF MB was made and designated as "HDPE-0".

Jetting Performance Test

Ducts, tubes, conduits, channels, and pipes (or other devices described herein) that include bends and turns can create friction spots, such as during installation of cables (or other elongated objects). For example, cables (e.g., plastic-sheath, rubber-sheath) can be installed in ducts, tubes, conduits, channels, and pipes by a push mechanism, and a low friction value between the cable and the duct, tube, conduit, channel, or pipe is highly desirable so that the cable can be easily pushed through a low-friction-layered duct, tube, conduit, channel, or pipe (e.g., inner surface). Lower friction between these two surfaces not only allows a longer reachable distance of the cable, but also reduces damages on the surfaces of both the cable and the duct, tube, conduit, channel, or pipe.

Note that the cable can be coated, as disclosed herein, whether additionally or alternatively. In some embodiments, a purpose of the "jetting performance" test is to simulate movement of a cable through a duct, tube, conduit, channel, or pipe and to measure a maximum reachable distance of the cable in the duct, tube, conduit, channel, or pipe under mechanical push conditions.

Figure 2:
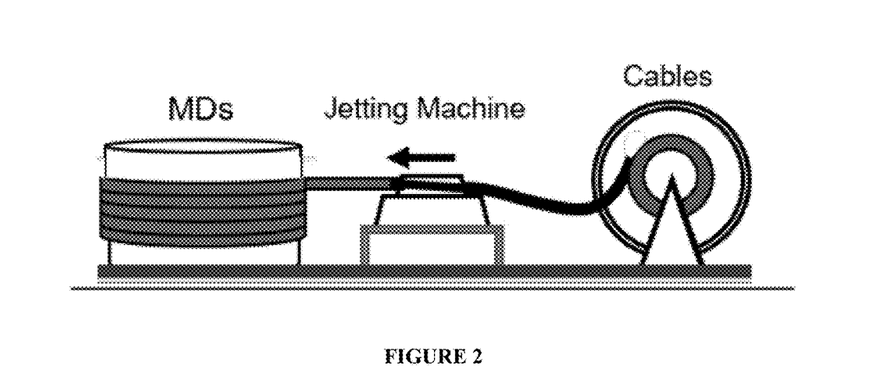
FIG. 2 is a schematic illustration of the Jetting Performance test according to various principles of this disclosure.
Figure 3:
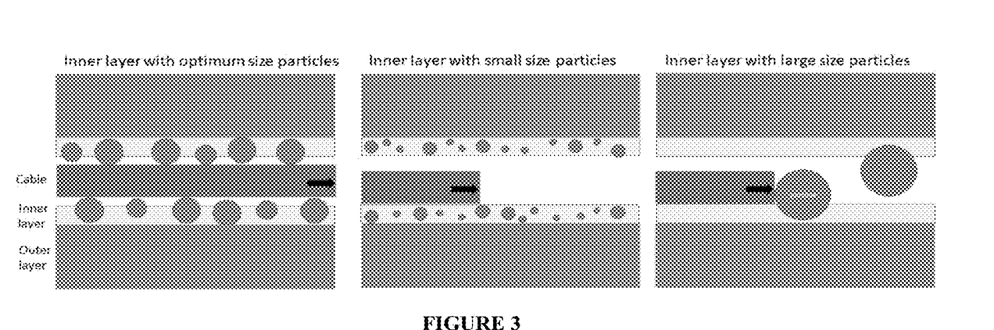
FIG. 3 is a schematic illustration of a ball bearing effect of PTFE particles according to various principles of this disclosure.

In the "jetting performance" test, a fiber optic cable (outer diameter=8 mm) was pushed through a pipe by GMP AirStream Model 89300, as illustrated in FIG. 2. Jetting performance results are summarized in Table 3.

TABLE 3

| LDRs of ULF MB | Jetting Distance (ft, Avg. ± Stdev.) |
|---|---|
| HDPE-0 | 84 ± 5 |
| ULF-5 | 247 ± 7 |
| ULF-10 | 273 ± 9 |
| ULF-20 | 336 ± 12 |
| ULF-30 | 410 ± 19 |

As shown in Table 3, with an LDR of as little as about 5% (ULF-5), a jetting distance of 247 feet was achieved, which is about three (3) times higher than the jetting distance achieved with HDPE-0, the control. With an LDR of 30% (ULF-30), an even higher jetting distance of about 410 feet, which is about five (5) times the jetting distance with HDPE-0, was achieved.

Optimal Size of PTFE Particles as a Solid Lubricant for Low Friction

During cable placement, wear of the PTFE impregnated surface can expose further solid lubricants and not effectively increase friction between the respective elements. In general, the size of the PTFE particles can influence many physical properties of materials, especially powders, and therefore, it is a critical indicator for quality control and enhanced performance. In some embodiments, it is advantageous to use smaller PTFE particles for improving tribological properties; hence, the size of the PTFE particles can be optimized for enhanced performance.

Particle size distribution was analyzed ($D_{50}$=median value of particle size diameters; $D_{90}$=value where about 90% of the distribution has smaller size particle diameters) using three different PTFE products, and its effect on kinetic COF values was verified.

As shown in Table 4, compared with the control (HDPE-0), kinetic COF values were significantly improved (about 29%) in PTFE particles that have $D_{50}$=about 46.21 μm and $D_{90}$=about 166.3 μm. However, in comparison with these measurements from plaques having the smaller PTFE, plaques containing PTFE with larger diameter displayed significantly deteriorated COF values. The tested PTFE having about 18% larger $D_{50}$ (about 54.58 μm) and about 60% larger $D_{90}$ (about 266.9 μm) showed about 25% inferior COF values compared to the corresponding values for smaller PTFE particles. In some embodiments, these results can show that it is critical to use PTFE having an optimal size, including up to about 46.21 μm of $D_{50}$ and about 166.3 μm of $D_{90}$ to achieve ease of cable placement. The kinetic COF values are average±standard deviation of >3 replications.

TABLE 4

| | Particle Size (μm) | | Kinetic COF |
|---|---|---|---|
| Description | D50 | D90 | (Avg. ± Stdev.) |
| HDPE-0 | None | None | 0.193 ± 0.032 |
| PTFE-1 | 3.57 | 5.5 | 0.137 ± 0.014 |
| PTFE-2 | 46.21 | 166.3 | 0.137 ± 0.022[N.S.] |
| PTFE-3 | 54.58 | 266.9 | 0.171 ± 0.004** |

[N.S.], not significant;
**P < 0.01 of Student's t-test.

Alternative Solid Lubricants for Low Friction

Table 5 shows a range of possible ULF MB and its LDR using graphene. Graphene is an anisotropic material that has low shear strength in the sliding direction and high compression strength in the loading direction, as an alternative to using PTFE as a solid lubricant.

TABLE 5

| Components | Amount (% w/w) |
|---|---|
| Graphene MB | 10.0 to 40.0 |
| UHMW Siloxane MB | 20.0 to 60.0 |
| Fluoropolymer-based PPA MB | 10.0 to 15.0 |
| Hydrocarbon-based PPA MB | 10.0 to 25.0 |

Table 6 below lists the various components, and respective amounts, of a composition in which the letdown ratio (LDR) was controlled using gravimetric feeders at about 10% of ULF MB ("ULF-10"):

TABLE 6

| Components | Amount (% w/w) |
|---|---|
| Graphene MB | 1.7 |
| UHMW Siloxane MB | 4.3 |

TABLE 6-continued

| Components | Amount (% w/w) |
|---|---|
| Fluoropolymer-based PPA MB | 1.5 |
| Hydrocarbon-based PPA MB | 2.5 |

Jetting performance and COF values of the active material (PTFE and graphene)-containing compositions were compared at the same loading amount of PTFE and graphene in the base HDPE polymer, and the results are shown in Table 7. In comparison with the jetting distance of the control (0% loading), about 0.2% loading of graphene showed a two-fold improvement of values, which supports the use of graphene as a solid lubricant. Both measurements were improved by level of loading amounts up to about 10%. Based on these values, graphene can also be applied as a solid lubricant for the ULF inner layer.

TABLE 7

| Amount (%) of Active Material | PTFE-containing UL MB | | Graphene-containing ULF MB | |
|---|---|---|---|---|
| | Jetting (ft)$^§$ | Kinetic COF$^¶$ | Jetting (ft)$^§$ | Kinetic COF$^¶$ |
| 0.0 | 84 | 0.228 ± 0.041 | 84 | 0.228 ± 0.041 |
| 0.2 | 164 ± 1 | 0.228 ± 0.060 | 172 ± 9 | 0.263 ± 0.041 |
| 1.6 | 209 ± 4 | 0.153 ± 0.014 | 187 ± 3 | 0.182 ± 0.032 |
| 10.0 | 252 ± 11 | 0.130 ± 0.032 | 218 ± 12 | 0.177 ± 0.023 |

$^§$Avg. ± Stdev. of 3 reps or 1 measurement (0% loading).
$^¶$Avg. ± Stdev. of >3 reps.

Synergistic Effect of Solid Lubricant with UHMW Siloxane Polymer

As described above, some mixing of some different lubrication materials to improve some tribological properties have been attempted previously (lubricants have mixed components). The combination of the two (2) lubricants of this application—PTFE and UHMW siloxane—displays a synergistic effect, as demonstrated by a significantly enhanced jetting performance of a pipe with an inner layer pre-lubricated with 2% PTFE MB blended with 2% of a UHMW Siloxane MB compared to the jetting performance of the individual PTFE-MB and UHMW Siloxane MB. The PTFE MB has about 40% of PTFE and the siloxane MB has about 50% of UHMW Siloxane. These results are shown in Table 8, and demonstrate the superior properties of the material composition described herein.

TABLE 8

| Description | Jetting (ft)$^§$ |
|---|---|
| PTFE MB 2% + UHMW Siloxane MB 2% | 272 ± 2 |
| PTFE MB 4% | 209 ± 4*** |
| UHMW Siloxane MB 4% | 236 ± 7** |

$^§$Jetting performance is Avg. ± Stdev. of 3 reps.
***P < 0.001
**P < 0.01 of Student's t-test.

Effect of Using a Combination of PPAs Versus Using a Single PPA

In an embodiment, a hydrocarbon-based PPA is polyethylene-based PPA having a molecular weight of 2,000,000 to 3,000,000. The polyethylene-based PPA can have an extremely low glass transition temperature (Tg) of about −80° C. and can improve crystallization kinetics by keeping a melt temperature and a crystallization temperature constant. The polyethylene based PPA can be beneficial for controlling other physical properties as well, including improving low temperature impact and flexibility. The combination of two (2) PPAs having different chemistries can result in multiple benefits for processing conditions and properties, such as reduction of die build-up during the extrusion, improvement of speed of production by about 25% from 60 fpm vs. 75 fpm at lower processing temperature (about 330° F.), impact resistance under low temperature, and smoother surfaces.

For example, the HDPE-0 control maintained its integrity for impact resistance at cold temperatures (for example, at about −25° C.), but samples containing a commercially available fluoropolymer-based PPA showed reduced resistance against impact (more than a half of the tested samples were cracked). In comparison, when a hydrocarbon-based PPA and a fluoropolymer-based PPA, i.e., two PPAs having different characteristics, are used in combination, the tested samples had an impact resistance comparable to the impact resistance of the HDPE-0 control. These results are shown in Table 9. Additionally, the hydrocarbon-based PPA showed not only enhanced processing speed and cold impact resistance, but also presented significantly improved COF values. These observations evidence that the combination of two PPAs having different chemistries presents synergistic as well as pleiotropic effects for improving the processing conditions and properties of final products.

TABLE 9

| Description | Number of Cracked Samples at −25° C. Impact | Kinetic COF (Avg. ± Stdev.)$^§$ |
|---|---|---|
| HDPE-0 | 1/7 | 0.228 ± 0.041 |
| Fluoropolymer-based PPA MB, 4% | 4/7 | 0.240 ± 0.052$^{N.S.}$ |
| Hydrocarbon-based PPC MB, 4% | 0/7 | 0.158 ± 0.005** |
| Fluoropolymer-based PPA MB, 2% + hydrocarbon-based PPA MB, 2% | 1/7 | 0.172 ± 0.017** |

$^§$Kinetic COF values are average ± standard deviation of >3 reps
$^{N.S.}$, not significant
**P < 0.01 of Student's t-test Although the embodiments of this disclosure have been described in detail with reference to the accompanying examples and drawings, this disclosure is not limited thereto and can be embodied in many different forms without departing from the technical concept of the present disclosure. Therefore, various embodiments of this disclosure are provided for illustrative purposes only and are not intended to limit the technical concept of the present disclosure. The protective scope of the present disclosure should be construed based on any appended claims and combinations thereof, and all the technical concepts in the equivalent scope thereof should be construed as falling within the scope of the present disclosure. As various changes could be made in the above methods and compositions without departing from the scope of the invention, it is intended that all matter contained in the above description shall be interpreted as illustrative and not in a limiting sense. Other embodiments within the scope of the claims herein will be apparent to one skilled in the art from consideration of the specification or practice of the exemplary embodiments disclosed herein. It is intended that the specification be considered exemplary only, with the scope and spirit of the described subject matter being indicated by the claims.

What is claimed is:

1. A polymeric material mixture, comprising:
a fluorine-containing polymer, a siloxane polymer, and at least two polymer processing additives (PPAs), wherein the at least two PPAs have different chemistries, wherein the fluorine-containing polymer includes polytetrafluoroethylene (PTFE), wherein the siloxane polymer includes an ultra-high molecular weight (UHMW) siloxane polymer having a viscosity of about 1 million mm$^2$/s to about 100 million mm$^2$/s, wherein the at least two PPAs collectively include a fluoropolymer-based material having a molecular weight of about 1,000,000 to about 5,000,000 and a polyethylene-based material having a molecular weight of 2,000,000 to 3,000,000, wherein the PTFE is in an amount of about 10.0% (w/w) to about 20.0% (w/w), the UHMW siloxane polymer is in an amount of about 20.0% (w/w) to about 40.0% (w/w), the fluoropolymer-based material is in an amount of about 10.0% (w/w) to about 15.0% (w/w), and the polyethylene-based material is in an amount of about 10.0% (w/w) to about 25.0% (w/w), based on a total weight of the polymeric material mixture, wherein a particle size distribution of the PTFE has a D50 of about 40 μm to about 50 μm and a D90 of about 150 μm to about 200 μm, and wherein the D50 is a median value of particle size diameters in the particle size distribution and the D90 is a particle size value at which about 90% of the particle size distribution has a smaller size particle diameter.

2. The polymeric material mixture of claim 1, wherein the D50 is about 46 μm and the D90 is about 166 μm.

3. The polymeric material mixture of claim 1, further comprising graphene.

4. A polymeric material mixture, comprising:
a graphene, a siloxane polymer, and at least two polymer processing additives (PPA), wherein the at least two PPAs have different chemistries, wherein the siloxane polymer includes an ultra-high molecular weight (UHMW) siloxane polymer having a viscosity of about 1 million mm$^2$/s to about 100 million mm$^2$/s, wherein the at least two PPAs collectively include a fluoropolymer-based material having a molecular weight of about 1,000,000 to about 5,000,000 and a polyethylene-based material having a molecular weight of 2,000,000 to 3,000,000, and wherein the graphene is in an amount of about 10.0% (w/w) to about 40.0% (w/w), the UHMW siloxane polymer is in an amount of about 20.0% (w/w) to about 60.0% (w/w), the fluoropolymer-based material is in an amount of about 10.0% (w/w) to about 15.0% (w/w), and the polyethylene-based material is in an amount of about 10.0% (w/w) to about 25.0% (w/w), based on a total weight of the polymeric material mixture.

5. A flexible coextruded pipe providing a protective housing to a cable, a fluid, a sludge, or a solid, said flexible coextruded pipe comprising a pair of telescopically related inner and outer cylindrical layers, wherein said inner layer is lubricated with the polymeric material mixture of claim 1, and wherein said outer layer comprises a polymeric material, metal, or composite.

6. A method of manufacturing a flexible coextruded pipe to provide a protective housing for a cable, a fluid, a sludge, or a solid, the method comprising: coating an inner layer of the flexible coextruded pipe comprising a pair of telescopically related inner and outer cylindrical layers with the polymeric material mixture of claim 1.

7. A method for transporting a material through the flexible coextruded pipe, the method comprising passing the material including the solid, the sludge, or the fluid through the flexible coextruded pipe of claim 5.

8. A device, comprising:
a surface coated with a mixture including a fluorine-containing polymer, a siloxane polymer, and a plurality of polymer processing additives (PPAs), wherein the PPAs have different chemistries, wherein the fluorine-containing polymer includes polytetrafluoroethylene (PTFE), wherein the siloxane polymer includes an ultra-high molecular weight (UHMW) siloxane polymer having a viscosity of about 1 million mm$^2$/s to about 100 million mm$^2$/s, wherein the at least two PPAs collectively include a fluoropolymer-based material having a molecular weight of about 1,000,000 to about 5,000,000 and a polyethylene-based material having a molecular weight of 2,000,000 to 3,000,000, wherein the PTFE is in an amount of about 10.0% (w/w) to about 20.0% (w/w), the UHMW siloxane polymer is in an amount of about 20.0% (w/w) to about 40.0% (w/w), the fluoropolymer-based material is in an amount of about 10.0% (w/w) to about 15.0% (w/w), and the polyethylene-based material is in an amount of about 10.0% (w/w) to about 25.0% (w/w), based on a total weight of the mixture, wherein a particle size distribution of the PTFE has a D50 of about 40 μm to about 50 μm and a D90 of about 150 μm to about 200 μm, and wherein the D50 is a median value of particle size diameters in the particle size distribution and the D90 is a particle size value at which about 90% of the particle size distribution has a smaller size particle diameter.

9. A mixture comprising:
a fluorine-containing polymer, a siloxane polymer, and a plurality of polymer processing additives (PPAs), wherein the PPAs have different the fluorine-containing polymer includes chemistries, wherein polytetrafluoroethylene (PTFE), wherein the siloxane polymer includes an ultra-high molecular weight (UHMW) siloxane polymer having a viscosity of about 1 million mm$^2$/s to about 100 million mm$^2$/s, wherein the PPAs collectively include a fluoropolymer-based material having a molecular weight of about 1,000,000 to about 5,000,000 and a polyethylene-based material having a molecular weight of 2,000,000 to 3,000,000, wherein the PTFE is in an amount of about 10.0% (w/w) to about 20.0% (w/w); the UHMW siloxane polymer is in an amount of about 20.0% (w/w) to about 40.0% (w/w), the fluoropolymer-based material is in an amount of about 10.0% (w/w) to about 15.0% (w/w), and the polyethylene-based material is in an amount of about 10.0% (w/w) to about 25.0% (w/w), based on a total weight of the mixture, wherein a particle size distribution of the PTFE has a D50 of about 40 μm to about 50 μm and a D90 of about 150 μm to about 200 μm, wherein the D50 is a median value of particle size diameters in the particle size distribution and the D90 is a particle size value at which about 90% of the particle size distribution has a smaller size particle diameter.

10. The device of claim 8, wherein the surface is an inner surface of a tube and engages a cable.

11. The device of claim 10, wherein the cable is a fiber optic cable.

12. The device of claim 10, wherein the cable is an electrical cable.

13. The device of claim 8, wherein the surface is an inner surface of a tube and engages a wire, a rope, a chain, or a line.

14. The device of claim 8, wherein the surface is an inner surface of a tube and engages a liquid.

15. The device of claim 8, wherein the surface is an inner surface of a tube of a medical device.

16. The device of claim 8, wherein the surface is an inner surface of a tube and engages a bead, a powder, or a particulate.

17. The device of claim 8, wherein the surface is an outer surface of an object.

18. The device of claim 8, wherein the surface is an inner surface of an object.

\* \* \* \* \*